(12) United States Patent
Ravishankar

(10) Patent No.: US 7,947,786 B2
(45) Date of Patent: May 24, 2011

(54) ELASTOMERIC REACTOR BLEND COMPOSITIONS

(75) Inventor: Periagaram Srinivasan Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 571 days.

(21) Appl. No.: 11/662,622

(22) PCT Filed: Sep. 28, 2005

(86) PCT No.: PCT/US2005/034946
§ 371 (c)(1), (2), (4) Date: Mar. 12, 2007

(87) PCT Pub. No.: WO2006/044149
PCT Pub. Date: Apr. 27, 2006

(65) Prior Publication Data
US 2008/0027173 A1    Jan. 31, 2008

Related U.S. Application Data

(60) Provisional application No. 60/618,301, filed on Oct. 13, 2004, provisional application No. 60/645,138, filed on Jan. 20, 2005.

(51) Int. Cl.
C08F 2/00      (2006.01)
C08F 8/00      (2006.01)
C08G 85/00     (2006.01)
C08L 23/00     (2006.01)

(52) U.S. Cl. ............. 526/68; 526/70; 526/71; 525/240; 525/191; 525/197

(58) Field of Classification Search .................. 525/240, 525/191, 197; 526/68, 70, 71
See application file for complete search history.

(56) References Cited

U.S. PATENT DOCUMENTS

| | | | |
|---|---|---|---|
| 3,969,470 A * | 7/1976 | Spiegelman ............ 525/53 |
| 4,016,342 A | 4/1977 | Wagensommer | |
| 4,035,445 A * | 7/1977 | Baumgartner ......... 525/54 |
| 4,306,041 A | 12/1981 | Cozewith et al. | |
| 4,871,805 A | 10/1989 | Shimomura et al. | |
| 4,950,720 A * | 8/1990 | Randall et al. ........... 525/322 |
| 4,970,118 A * | 11/1990 | Kresge et al. ........... 428/407 |
| 5,175,208 A * | 12/1992 | Asanuma et al. ......... 525/53 |
| 5,464,906 A | 11/1995 | Patton et al. | |
| 5,696,213 A | 12/1997 | Schiffino et al. | |
| 5,804,677 A * | 9/1998 | Chinh et al. ............ 526/68 |
| 5,898,053 A * | 4/1999 | Leaney et al. .......... 526/68 |
| 5,977,251 A | 11/1999 | Kao et al. | |
| 6,028,140 A | 2/2000 | Collina et al. | |
| 6,127,484 A | 10/2000 | Cribbs et al. | |
| 6,174,969 B1 | 1/2001 | Kersting et al. | |
| 6,207,756 B1 | 3/2001 | Datta et al. | |
| 6,245,867 B1 | 6/2001 | Debras | |
| 6,262,195 B1 | 7/2001 | Dall'Occo et al. | |
| 6,319,998 B1 * | 11/2001 | Cozewith et al. ........ 526/65 |
| 6,329,477 B1 | 12/2001 | Harrington et al. | |
| 6,410,660 B1 | 6/2002 | Johnson et al. | |
| 6,545,088 B1 | 4/2003 | Kolthammer et al. | |
| 6,635,715 B1 | 10/2003 | Datta et al. | |
| 6,747,114 B2 * | 6/2004 | Karandinos et al. ....... 526/348.2 |
| 6,750,284 B1 | 6/2004 | Dharmarajan et al. | |
| 2002/0016415 A1 | 2/2002 | Laughner et al. | |
| 2003/0204017 A1 * | 10/2003 | Stevens et al. .......... 525/53 |
| 2004/0198913 A1 | 10/2004 | Datta et al. | |

FOREIGN PATENT DOCUMENTS

| | | |
|---|---|---|
| JP | 05320245 | 12/1993 |
| WO | WO 91/19764 | 12/1991 |
| WO | WO 93/13143 | 7/1993 |
| WO | WO 97/36942 | 10/1997 |
| WO | WO 98/02471 | 1/1998 |
| WO | WO 98/54252 | 12/1998 |
| WO | WO 99/14271 | 3/1999 |
| WO | WO 02/34795 | 5/2002 |
| WO | WO 02/074816 | 9/2002 |
| WO | WO 03/040201 | 5/2003 |

* cited by examiner

Primary Examiner — Vasu Jagannathan
Assistant Examiner — Irina Krylova

(57) ABSTRACT

Disclosed herein are various processes, including but not limited to a continuous process for making an elastomer composition having a Mooney Viscosity (ML (1+4) @ 125° C.) of from 16 to 180, the composition including a first polymer and a second polymer, the process comprising: polymerizing a first monomer system that includes propylene and one or both of ethylene and propylene in a solvent using a first catalyst system in a first polymerization zone to provide a first polymer, having 60 wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45; polymerizing a second monomer system that includes ethylene or an alpha-olefin, or both, in a solvent using a second catalyst system in a second polymerization zone to provide a second polymer which is an elastomeric polymer that is either non-crystalline or has ethylene-derived crystallinity; combining the first polymer and the second polymer in a mixture that includes solvent and unreacted monomer; and removing solvent from the mixture to provide an elastomer composition that having a Mooney Viscosity (ML (1+4) @125° C.) of from 16 to 180.

14 Claims, 1 Drawing Sheet

ELASTOMERIC REACTOR BLEND COMPOSITIONS

CROSS REFERENCE TO RELATED APPLICATIONS

This application is a 371 National Stage Application of International Application No. PCT/US05/34946, filed Sep. 28, 2005 which claims the benefit of Ser. Nos. 60/618,301, filed Oct. 13, 2004, and 60/645,138, filed Jan. 20, 2005, the disclosures of which are incorporated by reference in their entireties.

BACKGROUND

1. Field of Invention

This application relates to elastomeric reactor blend compositions and to continuous processes for making an elastomer composition that comprises a first polymer and a second polymer with differing levels and/or types of crystallinity.

2. Description of Related Art

Embodiments of the invention relate to elastomeric reactor blend compositions. There have existed ongoing efforts to make polymer compositions having a desirable balance of properties and attributes, leading to enhanced compositions that are useful in a number of applications. Such composition enhancements can manifest themselves in a variety of ways depending on the specific application and the specific blend contemplated. Such enhancements include, but are not limited to, (1) processability in the molten state in such processes as milling, extrusion, calendering and injection molding; (2) initial physical properties in a solid state such as toughness, tack, adhesion, tear resistance, tensile and elongation (3) improvements in cure rate and state if curing or vulcanization are intended; and (4) long-term physical properties such as heat aging as defined by the retention of such physical properties at elevated temperatures. A variety of approaches have been suggested to obtain polymer compositions with the desired properties and attributes, but those approaches have experienced various shortcomings.

U.S. Pat. No. 6,635,715 discloses blends of an ethylene propylene elastomer having a low level of isotactic crystallinity with different amounts of a highly crystalline propylene based polymer. The blends are produced by physically blending the components.

U.S. Pat. No. 6,329,477 discloses the use of series reactors in the production of polymer compositions using a biscyclopentadienyl type metallocene catalyst but the compositions do not have two polymers with widely varying propylene contents. Other patents relating to the production of polymer compositions are U.S. Pat. Nos. 6,319,998 and 6,207,756.

WO 98/02471 and U.S. Pat. No. 6,545,088 disclose the use of series reactors in the production of EP rubbers using a monocyclopentadienyl type metallocene catalyst.

WO 03/040201 discloses the use of series reactor operations using a non-metallocene type catalyst to produce polymer compositions with varying crystallinity. No indication is provided for using implementation in continuous operation using a recycle or process conditions permitting molecular weights etc. appropriate for commercial elastomer use.

Other background references include U.S. Pat. No. 6,747,114, U.S. Patent Application Publication 2004/198913, WO 1997/36942, and WO 2002/34795.

It is among the objects of the invention to scope new polymer compositions where the benefits of series and/or parallel reactor operation are exploited to provide useful elastomers having an overall Mooney from 16 to 180, and to employ the series reactor recycle yet at the same time provide polymers in the composition with have different crystallinity (isotactic propylene type, ethylene type, or fully amorphous). It also among the objects of the invention to provide continuous multiple reactor process conditions that enable such polymer compositions to be made efficiently on commercial scale plants.

SUMMARY

Disclosed herein are various processes, including but not limited to a continuous process for making an elastomer composition having a Mooney Viscosity (ML (1+4) @ 125° C.) of from 16 to 180, the composition including a first polymer and a second polymer, the process comprising: polymerizing a first monomer system that includes propylene and one or both of ethylene and propylene in a solvent using a first catalyst system in a first polymerization zone to provide a first polymer, having 60 wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45; polymerizing a second monomer system that includes ethylene or an alpha-olefin, or both, in a solvent using a second catalyst system in a second polymerization zone to provide a second polymer which is an elastomeric polymer that is either non-crystalline or has ethylene-derived crystallinity; combining the first polymer and the second polymer in a mixture that includes solvent and unreacted monomer; and removing solvent from the mixture to provide an elastomer composition that having a Mooney Viscosity (ML (1+4) @125° C.) of from 16 to 180.

Disclosed herein are various processes, including but not limited to a continuous process for making an elastomer composition that includes a first polymer and a second polymer, the process comprising: polymerizing a first monomer system that includes propylene and one or both of ethylene and propylene in a solvent using a first catalyst system in a first polymerization zone to provide a first polymer, having 60 wt % or more units derived from propylene, including isotactically-arranged propylene-derived sequences; polymerizing a second monomer system that includes ethylene or an alpha-olefin, or both, in a solvent using a second catalyst system in a second polymerization zone to provide a second polymer that is elastomeric and either non-crystalline or has ethylene-derived crystallinity; combining the first polymer and the second polymer in a mixture that includes solvent and unreacted monomer; removing solvent from the mixture to provide the elastomer composition; and recycling propylene and ethylene monomers and solvent; wherein the first polymerization is conducted to deplete propylene monomers to a level below what is desired for making the second polymer; the second polymerization and recycle are operated to reduce the ethylene monomers to a level below what is required for making the first polymer, with additional makeup propylene monomer being added for the first polymerization and additional makeup ethylene monomer being added for the second polymerization. The process can be configured either as series reactors or parallel reactors.

Also disclosed herein are multistage reactor systems, including a multistage reactor system for making an elastomer composition that includes a first polymer and a second polymer, the system comprising: (a) a first polymerization zone in which the first polymer is formed, the first structure having at least one inlet for receiving a first monomer mixture and solvent and at least one outlet for dispensing a first effluent that includes the first polymer; (b) a second polymerization zone in which the second polymer is formed, having at least one inlet for receiving a second monomer mixture and solvent and at least one outlet for dispensing a second effluent that includes a second polymer; (c) a vessel or other zone for receiving an effluent that includes solvent, unreacted monomers, first polymer and second polymer; (d) a main first effluent line for directing effluent from the first structure to the second structure, such that the reactor system can be operated in a series mode using the main effluent line; (e) a bypass first effluent line for causing the first effluent to bypass the second reactor, such that the reactor system can be operated in a parallel mode using the bypass effluent line; and (f) a second effluent line for directing effluent from the second structure to the third structure.

Also disclosed are multistage reactor systems for making an elastomer composition that includes a first polymer and a second polymer, the system comprising: (a) a first polymerization zone in which the first polymer is formed, the first structure having at least one inlet for receiving a first monomer mixture and solvent and at least one outlet for dispensing a first effluent that includes the first polymer; (b) a second polymerization zone in which the second polymer is formed, the second structure having at least one inlet for receiving a second monomer mixture and solvent and at least one outlet for dispensing a second effluent that includes a second polymer; (c) a vessel or other zone for receiving an effluent that includes solvent, unreacted monomers, first polymer and second polymer; and (d) a recycle line configured to direct effluent that includes solvent and unreacted monomers to the first polymerization zone, or the second polymerization zone, or both in series mode or in parallel mode.

DETAILED DESCRIPTION

Figure 1:
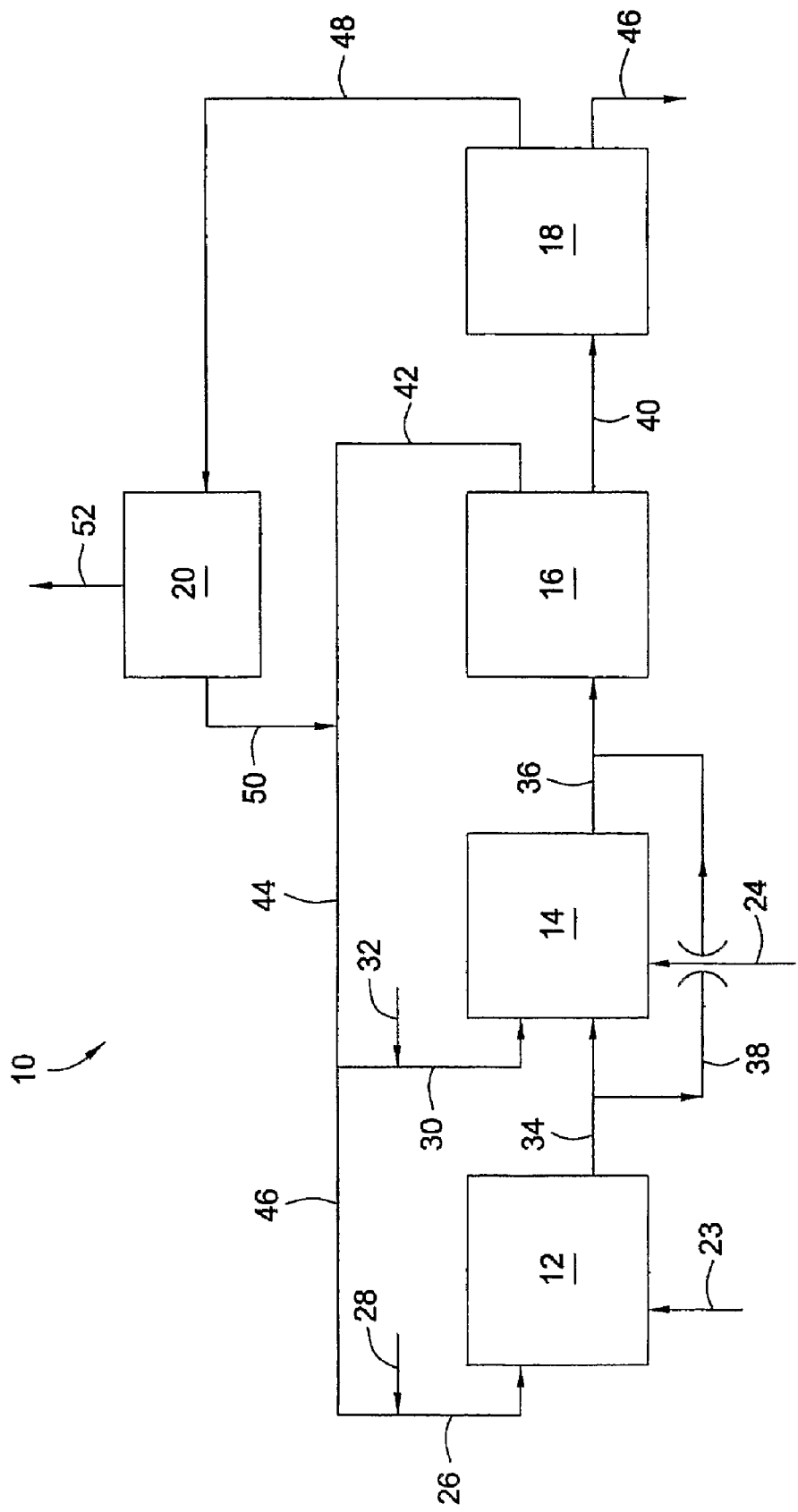
FIG. 1 illustrates an example of a reactor configuration capable of operating in series reactor or parallel reactor modes.

A detailed description will now be provided, beginning with various definitions and properties, followed by an outline of specific embodiments, some of which are reflected in the claims, and then separate discussions of certain aspects of the claimed methods.

A. Definitions, Properties and Test Procedures:

Various terms as used herein are defined below. To the extent a term used in a claim is not defined below, it should be given the broadest definition persons in the pertinent art have given that term as reflected in at least one printed publication (e.g., a dictionary or article), issued patent or published application.

For purposes of convenience, various specific test procedures are identified for determining properties such as molecular weight, Mooney Viscosity, polydispersity (MWD), etc. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Continuous. When used to describe a process or an aspect of a process, e.g., a process step, the term "continuous" and its derivatives, including "continuously," shall cover any process or step in which reagents and reacted products are supplied and removed continuously so that steady state, stable reaction conditions can be achieved.

Non-crystalline. The term "non-crystalline" shall mean atactic or amorphous, shall exclude isotactic or syndiotactic (as defined elsewhere herein), and shall also exclude any material that either has a measurable melting point (using a DSC procedure) without annealing, or develops a measurable melting point after annealing for one week (168 hours).

Polymer. Except as required by the particular context, the term "polymer" as used herein is the product produced by particular continuous polymerization in a particular polymerization zone or reactor.

Polymerization. As used herein, the term "polymerization" is to be given the broadest meaning used by persons skilled in the art refers to the conversion of monomer into polymer. Polymerization zone refers to the zone in which polymerization takes place and is generally formed by a back mixed reactor for forming a substantially random polymer.

Polysplit. As used herein, the term "polysplit" shall mean the calculated result of the weight of the first polymer (propylene polymer) that is produced from the first polymerization zone divided by the combined weight of the first polymer and the second polymer (ethylene polymer), multiplied by 100. The same definition applies equally to series and parallel reactor configurations. That is, the propylene polymer is always regarded as the numerator.

Melting Point, Heat of Fusion and Crystallization. The polymers and compositions described herein can be characterized in terms of their melting points (Tm) and heats of fusion, which properties can be influenced by the presence of comonomers or steric impurities that hinder the formation of crystallites by the polymer chains. The properties can be determined by Differential Scanning Calorimetry (DSC), using the ASTM E-794-95 (version E-794-01) procedure or the procedure disclosed in U.S. Pat. No. 6,747,114, column 8, lines 14-31, which patent is hereby incorporated by reference in its entirety.

Comonomer Content. The comonomer content and sequence distribution o f the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt % $=82.585-111.987X+30.045X^2$, where X is the ratio of the peak height at 1155 $cm^{-1}$ and peak height at either 722 $cm^{-1}$ or 732 $cm^{-1}$, whichever is higher. For propylene ethylene copolymers having 75 wt % or less propylene content, the comonomer (ethylene) content can be measured using the procedure described in the Wheeler and Willis.

Tacticity. The term "tacticity" refers to the stereoregularity of the orientation of the methyl residues from propylene in a polymer. The "triad tacticity" of the polymers described herein can be determined from a $^{13}C$ nuclear magnetic resonance (NMR) spectrum of the polymer as described in U.S. Pat. No. 5,504,172, and U.S. Pat. No. 6,642,316, column 6, lines 38 through column 9, line 18, which patents are hereby incorporated by reference in their entirety.

Polyene content: The amount of the polyene present in the polymeric components can be inferred by the quantitative measure of the amount of the pendent free olefin present in the polymer after polymerization. Several procedures such as iodine number and the determination of the olefin content by $^{1}H$ or $^{13}C$ NMR have been established. In the particular case where the polyene is ENB the amount of polyene present in the polymers can be measured using ASTM D3900. The amount of polyene present is expressed on the basis of the total weight of (for example) ethylene and propylene-derived units.

Tacticity Index. The tacticity index, expressed herein as "m/r", can be determined by $^{13}C$ nuclear magnetic resonance (NMR). The tacticity index m/r can be calculated as defined in H. N. Cheng, Macromolecules, 17, 1950 (1984).

Isotactic, Syndiotactic and Atactic. The term "atactic" when used herein shall be defined as referring to any polymer having a tacticity index of from 2.0 to 4.0. The term "syndiotactic" when used herein shall be defined as referring to any polymer having a tacticity index of from 1.0 up to (but not including) 2.0. The term "isotactic" when used herein shall be defined as referring to any polymer having a tacticity index above 4.0.

Molecular Weight Characteristics. Various molecular weight characteristics (e.g., Mw and Mn) and molecular weight distribution Mw/Mn (MWD) of the polymer components (or polymers) described herein can be measured in accordance with the procedures disclosed in U.S. Pat. No. 6,525,157, column 5, lines 1-44, which patent is hereby incorporated by reference in its entirety.

Mooney Viscosity. The term "Mooney Viscosity" is a term used to characterize certain polymers, polymer components, and polymer compositions herein. As used herein, the term Mooney Viscosity (ML (1+4) @125° C.), or simply "Mooney Viscosity," is to be defined and measured according to the definition and measurement procedure set forth in U.S. Pat. No. 6,686,415, which is hereby incorporated by reference in its entirety, but particularly the text found in column 6, line 59 through column 7, line 59. Alternatively, any "Mooney Viscosity" value referenced herein (including those in the claims) is deemed to encompass any Mooney Viscosity measured in accordance with any recognized, published procedure for measuring Mooney Viscosity.

The term "MFR" as used herein stands for "Melt Flow Rate" and is used to characterize polymers, components and compositions. The units for "MFR" are grams per 10 minutes and the test to be herein for determining MFR is set forth in any version and condition set forth in ASTM-1238 that uses 2.16 kg at 230° C.

Intermolecular solubility and composition distributions. Other characteristics that may be referenced in certain claims are "intermolecular solubility distribution" and "intermolecular composition distribution." Also, particularly with respect to certain embodiments of the first polymer, a "homogeneous distribution" as used herein is defined as a statistically insignificant intermolecular difference of both distributions in the composition of the copolymer and in the tacticity of the polymerized propylene. The definitions of those terms and the manner of calculating them are disclosed in U.S. Pat. No. 6,525,157, column 9, lines 30-41 and column 10, lines 16-53, which patent is hereby incorporated by reference in its entirety.

B. Specific Embodiments of Processes and Compositions.

Specific embodiments are set forth below, some of which are also in the claims. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

In any of the processes described above or elsewhere herein, the solvent and unreacted monomer removed from the mixture can be recycled to the first, polymerization zone or to the second polymerization zone, or both.

In any of the processes described above or elsewhere herein, the solvent and unreacted monomer can be at least partially separated, in the course of recyling, prior to being introduced to the first or second polymerization zones.

In any of the processes described above or elsewhere herein, the first polymer can have, for example, a Mooney Viscosity (ML (1+4) @125° C.) of from 16 to 180 and a heat of fusion less than 45 J/g or a melting point less than 105° C. or both, and the second polymer has a Mooney Viscosity (ML (1+4) @125° C.) of from 1 to 45.

In any of the processes described above or elsewhere herein, the second polymer can be, for example, a random copolymer of ethylene and propylene.

In any of the processes described above or elsewhere herein, at least part of the effluent of the first polymerization zone can be continuously directed to the second polymerization zone.

In any of the processes described above or elsewhere herein, at least part of the effluent of the first polymerization zone can be combined with the effluent of the second polymerization zone.

In any of the processes described above or elsewhere herein, the first and second polymerization zones can be changed from operation in series mode to operation in parallel mode or from operation in parallel mode to operation in series mode, or both.

In any of the processes described above or elsewhere herein, the polysplit can range, for example, from 5 to 95.

In any of the processes described above or elsewhere herein, the composition can be a modified EP rubber with a polysplit ranging from 5 to 35, a Mooney Viscosity of from 16 to 100 Mooney Viscosity (ML (1+4) @125° C.) and an ethylene content of from 30 to 80 wt %.

In any of the processes described above or elsewhere herein, the composition can be a modified propylene elastomer with a polysplit ranging from 65 to 95, a Mooney Viscosity of from 16 to 45 Mooney Viscosity (ML (1+4) @125° C.) and an ethylene content of from 25 to 50 wt %.

In any of the processes described above or elsewhere herein, the mixture that includes the first polymer and the second polymer can be finished by devolatilization to form pellets or bales, and unreacted monomer and solvent are recovered and recycled to the first and second polymerization zones, or both polymerization zones.

Any of the processes described above or elsewhere herein may, for example, further include recycling propylene and ethylene monomers and solvent, in which the first polymerization is conducted to deplete propylene monomers to a level below what is desired for making the second polymer and in which the second polymerization and recycle are operated to reduce the ethylene monomers to a level below what is required for making the first polymer, with additional make up propylene monomer being added for the first polymerization and additional make up ethylene monomer being added for the second polymerization.

Any of the processes described above or elsewhere herein may, for example, further include providing a recycle stream, in which the fraction of the first polymer and the fraction of the second polymer produced are controlled by splitting the amount of solvent supplied to the first and second polymerization from the recycle stream and by providing additional fresh feed to vary the rate of flow and the heat removal capacity for each polymerization separately, the first polymerization preferably being at a temperature below the melting point of the first polymer and the second polymerization being at a temperature from 20 to 200° C. higher than the temperature for the first polymerization.

In any of the processes described above or elsewhere herein, a transfer agent such as hydrogen can be used to limit the molecular weight.

In any of the reactor systems described above or elsewhere herein, adoption of a parallel mode can be responsive to determining whether the polysplit corresponds to a preselected polysplit.

In any of the reactor systems described above or elsewhere herein, adoption of a parallel mode can be responsive to determining the propylene content of the propylene polymer.

In any of the processes described above or elsewhere herein, changing from a series mode to a parallel mode can be, for example, responsive to determining the ethylene content of the reactor blend composition.

In any of the processes described above or elsewhere herein, the parallel mode is preferably used when the polysplit is greater than or equal to a C3C2 Factor that constitutes a calculated combination of FPP (first polymer propylene content) and BPE (blend polymer ethylene content).

In any of the processes described above or elsewhere herein, the parallel mode is preferably used when the polysplit is greater than $575 * (100\text{-FPP})^{0.14} * (BPE)^{-0.81}$, wherein FPP is the propylene content (wt % of the propylene polymer and BPE is the ethylene content of either the series reactor blend composition or the parallel reactor blend composition.

Any of the processes described above or elsewhere herein may additionally comprise splitting the recycle stream into a first recycle stream and a second recycle stream, directing the first recycle stream to the first polymerization zone and directing the second recycle stream to the second polymerization zone.

Any of the processes described above or elsewhere herein may additionally comprise directing a majority of the recycle stream to the second polymerization zone.

Any of the processes described above or elsewhere herein may additionally comprise selecting the amount of solvent in the second recycle stream sufficient to (i) obtain a desired second polymerization temperature; or (ii) obtain a desired polysplit.

In any of the processes described above or elsewhere herein, removing solvent and unreacted monomer from the mixture can include (i) subjecting the mixture to a first separation step to provide a first solvent-rich stream extracted from the mixture (which may also be defined as the first polymer-lean stream, which preferably contains little or no polymer) and a first polymer-rich stream; (ii) subjecting the first polymer-rich stream to a second separation step to provide a second, more concentrated, polymer-rich stream; and (iii) combining the solvent-rich streams to provide a combined recycle stream for feeding to the first polymerization zone or the second polymerization zone or both. The solvent rich streams can contain equally volatile unreacted monomer. The first step may involve liquid separation or evaporation, whether heat assisted or not. The concentrated polymer rich stream can be subjected to vacuum to extract the last traces of solvent and monomer. This can be done by vacuum extraction from an agitated mass of polymer. The agitation may be provided by a thin film or strand evaporator, a twin screw extruder, or a devolatilizing LIST unit as described elsewhere.

In any of the processes described above or elsewhere herein, removing solvent and unreacted monomer from the mixture can include subjecting at least a portion of the mixture to liquid phase separation (preferably at high pressure) to provide a solvent-rich portion (polymer-lean portion) and a solvent-lean portion (polymer-rich portion), and wherein the solvent-rich portion is directed (e.g., as a recycle stream) to the first polymerization zone or the second polymerization zone or both.

In any of the processes described above or elsewhere herein, removing solvent and unreacted monomer from the mixture can include subjecting at least a portion of the mixture to devolatization to provide a solvent-rich portion and a solvent-lean portion, and wherein the solvent-rich portion is directed to the first polymerization zone or the second polymerization zone or both, e.g., as part of recycle.

In any of the processes described above or elsewhere herein, the recycle stream can be directed to the first polymerization zone and to the second polymerization zone to provide a recycle split, wherein the recycle split is adjusted based at least in part on a preselected polysplit or at least in part on the temperature of either the first or the second polymerization zone.

Any of the processes described above or elsewhere herein can be operated in a series reactor mode wherein a recycle stream is directed to the first polymerization zone and to the second polymerization zone to provide a recycle split, wherein the percent recycle to Reactor 1 is equal to $2.8 * (PS)^{0.67} * (RT2/RT1)^{1.11}$, and wherein PS=polysplit; RT2=second reactor temperature (° C.); and RT1=first reactor temperature (° C.).

Any of the processes described above or elsewhere herein can be operated in a parallel reactor mode wherein a recycle stream is directed to the first polymerization zone and to the second polymerization zone to provide a recycle split, wherein the percent recycle to Reactor 1 is equal to $4.5 * (PS)^{0.55} * (RT2/RT1)^{0.67}$, and wherein PS=polysplit; RT2=second reactor temperature (° C.); and RT1=first reactor temperature (° C.).

Among the compositions disclosed herein is a composition in pelletized or bale form having a combined Mooney (ML 1+4 at 125° C.) of from 16 to 180 and a heat of fusion of less than 50 J/g comprising a first polymer being an elastomeric random polymer having a content of propylene-derived units of at least 60 percent and including isotactically-arranged propylene-derived sequences and a heat of fusion of less than 45 J/g or a melting point less than 105° C. and a second polymer being a copolymer of ethylene and propylene-derived units having no or ethylene type crystallinity.

In certain processes described above or elsewhere herein, the Mooney Viscosity (ML (1+4) @125° C.) of the composition ranges from 16 to 180; or from any low of 16, or 20, or 24, to any high of 180, or 140, or 120.

In certain processes described above or elsewhere herein, the MFR of the first polymer ranges from 0.5 to 100 g/10 min; or from any low of 0.5, or 0.8, or 1.0 g/10 min. to any high of 40, or 30, or 20 g/10 min.

In certain processes described above or elsewhere herein, the MFR of the reactor blend ranges from 0.05 to 1.3 g/10 min.; or from any low of 0 05, or 0.06, or 0.07 g/10 min. to any high of 1.3, or 1.0, or 0.8 g/10 min.

In certain processes described above or elsewhere herein, the molecular weight (Mw) of the first polymer ranges from 80000 to 400,000; or from any low of 100,000, or 120,000, or 140,000 to any high of 400,000, or 350,000, or 300,000.

In certain processes described above or elsewhere herein, the molecular weight (Mn) of the first polymer ranges from 40,000 to 200,000; or from any low of 50,000, or 60,000, or 70,000 to any high of 200,000, or 175,000, or 150,000.

In certain processes described above or elsewhere herein, the molecular weight (Mw) of the composition ranges from 60,000 to 800,000; or ranges from any low of 60,000, or 90,000, or 120,000 to any high of 800,000, or 700,000, or 600,000.

In certain processes described above or elsewhere herein, the molecular weight (Mn) of the composition ranges from 30,000 to 160,000; or ranges from any low of 30,000, or 45,000, or 60,000 to any high of 160,000, or 140,000, or 120,000.

In certain processes described above or elsewhere herein, the polydispersity (Mw/Mn) of the first polymer ranges from 1.8 to 2.3; or from any low of 1.8, or 1.9, or 2.0 to any high of 2.3, or 2.2, or 2.1.

In certain processes described above or elsewhere herein, the polydispersity (Mw/Mn) of the composition ranges from 1.8 to 10; or from any low of 2.2, or 2.0, or 1.8 to any high of 10, or 6, or 3.5.

In certain processes described above or elsewhere herein, the polysplit (amount of first polymer made in the first polymerization as a percent of total composition) ranges from 5 to 95; or from a low of 5 or 15 or 25 to a high of 95 or 80or 60.

In certain processes described above or elsewhere herein, the first polymer comprises from 5 to 95 wt % of the total composition.

The first and second catalysts can be the same; or they can be different, but in certain embodiments can have the same activator, as noted elsewhere herein in greater detail. In certain processes described above or elsewhere herein, the first catalyst and/or the second catalyst can be a metallocene. In a more specific aspect, the first and/or second catalyst is a monocyclopentadienyl compound. The first and/or second catalyst can be a biscyclopentadienyl compound. The cyclopentadienyl ligand of the first and/or second catalyst can be an indenyl ligand. The first and/or second catalyst can also be a Ziegler-Natta catalyst. The first and/or second catalysts can also be a pyridine amine catalyst. In a specific aspect, the first catalyst can be any of the catalysts referenced in PCT Publication WO 03/040201, particularly those referenced as being supplied to the first reactor in a dual reactor scheme. Similarly, while the second catalyst can also be any of the catalysts referenced in PCT Publication WO 03/040201, a more specific second catalyst is any of those referenced as being supplied to the second reactor in a series reactor configuration.

In a broadest form, the compositions can be prepared using any SSC (single sited catalyst). Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

In any of the processes described above or elsewhere herein, the first and second catalysts can be unsupported catalysts.

In any of the processes described above or elsewhere herein, the second catalyst can be selected and used to incorporate higher alpha-olefins with substantially no stereoregularity.

In certain processes described above or elsewhere herein, the first catalyst is a chiral biscyclopentadienyl derivative and the second catalyst is a non-chiral bridged fluorenyl cyclopentadienyl derivative.

In certain processes described above or elsewhere herein, the first and second catalysts are used in conjunction with non-coordinating anion activators, and the same activators are used for the first and the second reactor, and are optionally accompanied by a scavenger such as a scavenging aluminum containing derivative.

In certain processes described above or elsewhere herein, the non-coordinating anion is a boron complex having at least two ligands with fused ring systems, preferably perfluorinated rings and most preferably a tetra-aryl complex.

Certain compositions described herein contain no or less than 5 wt % of fillers and no or less than 10 wt % of an isotactic polypropylene fraction having a melting point of 110° C. or higher.

In certain compositions described herein, the composition has an overall heat of fusion of from 1 to 45 J/g.

In certain compositions described herein the Mooney of the first polymer is less than 25 Mooney ML (1+4, 125° C.) and at least 10 units lower than the Mooney ML (1+4, 125° C.) of the overall composition.

Certain compositions described herein have an overall content of ethylene derived units less than 95 wt % based on the combined content of ethylene and propylene-derived units.

Certain compositions described herein comprise from 40 wt % ethylene to 60 wt % of ethylene derived units and preferably from 45 wt % or 55 wt %.

Certain compositions described herein have less than 30 wt % of ethylene derived units.

C. Multistage Polymerization

The reactor blends described herein are formed in a continuous "multistage polymerization," meaning that two (or more) different polymerizations (or polymerization stages) are conducted. More specifically, a multistage polymerization may involve either two or more sequential polymerizations (also referred to herein as a "series process"), or two or more parallel polymerizations (also referred to herein as a "parallel process").

The polymers made in the respective reactors of the continuous, multiple reactor solution plant are blended when in solution without prior isolation from the solvent. The blends may be the result of series reactor operation, where the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized blend. Either case permits a wide variety of polysplits to be prepared whereby the proportion of the amounts of polymers produced in the respective reactors can be varied widely.

The first polymer and second polymer making up the reactor blend composition are discussed below, followed by a section on the series process, and then a section on the parallel process. Pertinent differences between the series and parallel processes will be identified where appropriate, but otherwise the series process discussion should be regarded as equally applicable to parallel processes.

D. First Polymer (Propylene Polymer)

As noted above, the reactor blends herein preferably include at least a first polymer, which is preferably the polymer formed by a first polymerization reaction (under conditions described elsewhere herein) and preferably in a "first reactor" as part of a series process or a parallel process.

The first polymer (also referred to herein as the "propylene polymer") should have (at minimum) 50 wt % propylene units, and preferably more, as noted below. The first polymer should be a propylene polymer (preferably a polypropylene copolymer) having 60 wt % or more units derived from propylene, having isotactically-arranged propylene-derived sequences and having a heat of fusion less than 45 J/g. The first polymer preferably has at least 5 wt % non-propylene comonomer units, e.g, ethylene units, and more preferably at least 10 wt % or more ethylene units. The crystallinity of the first polymer is derived from isotactic polypropylene sequences. The isotacticity of the first polymer can be illustrated by the presence of a preponderance of the propylene residues in the polymer in mm triads.

The crystallinity of the first polymer can be expressed in terms of heat of fusion. The first polymer of the invention can have a heat of fusion, as determined by DSC, ranging from any lower limit of 1.0 J/g, or 1.5 J/g, or 3.0 J/g, or 4.0 J/g, or 6.0 J/g, or 7.0 J/g, to any upper limit of 30 J/g, or 40 J/g, or 50 J/g, or 60 J/g, or 75 J/g. Preferably, the heat of fusion of the first polymer is less than 45 J/g. Without wishing to be bound by theory, it is believed that the first polymer has generally isotactic crystallizable propylene sequences, and the above heats of fusion are believed to be due to the melting of these crystalline segments.

The level of crystallinity of the first polymer can also be reflected in its melting point. Preferably, the first polymer has a single melting point. However, a sample of propylene copolymer will often show secondary melting peaks adjacent to the principal peak. The highest peak is considered the melting point. The first polymer described herein can have a melting point by DSC within the range having any upper limit of 115° C., or 110° C., or 105° C., or 90° C., or 80° C., or 70° C., and any lower limit of 0° C., or 20° C., or 25° C., or 30° C., or 35° C., or 40° C., or 45° C. Preferably, the first polymer has a melting point of less than 105° C., and more preferably less than 100° C., and even more preferably less than 90° C. Also, it is preferred that the first polymer have a melting point greater than about 25° C., or 40° C.

For the first polymer, at least 75% by weight of the polymer, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

In certain embodiments, the percentage of mm triads in the first polymer, as determined by the method for determining triad tacticity, is in the range having any upper limit of 98%, or 95%, or 90%, or 85%, or 82%, or 80%, or 75%, and any lower limit of 50%, or 60%.

Certain first polymers have an isotacticity index greater than 0%, or within the range having any upper limit of 50%, or 25% and any lower limit of 3%, or 10%.

Certain first polymers can have a tacticity index (m/r) within the range having any upper limit of 800, or 1000, or 1200, and those polymers may have any lower limit of 40, or 60.

As noted below, the first polymerization (and also second polymerization) may in certain cases be conducted in the presence of an α-olefin; thus the resulting polymer formed when such a-olefin is present will include "units derived" from such α-olefin. Either the same α-olefin or different α-olefins can be introduced to the first and second polymerizations. Conveniently, such α-olefins preferably have from 3-10 carbon atoms. Particular examples of those α-olefins are $C_3$-$C_{20}$ alpha-olefins, include, but are not limited to propylene; butene-1; pentene-1,2-methylpentene-1,3-methylbutene-1; hexene-1,3- methylpentene-1,4-methylpentene-1, 3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-I and hexadodecene-1.

The first polymer may optionally include a polyene. The optional polyene may be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of the optional polyene include, but are not limited to butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbomadiene; methyl-tetrahydroindene; dicyclopentadiene; bicyclo-(2.2.1 )-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

Any first polymer that contains ethylene preferably has statistically insignificant intramolecular differences of composition, which is the ratio of propylene to ethylene along the segments of the same chain (intramolecular). This compositional analysis is inferred from the process used for the synthesis of these polymers, and can also be determined by $^{13}C$ NMR, which locates the comonomer residues and propylene insertion errors in relation to the neighboring propylene residues.

The first polymer also preferably has statistically insignificant intramolecular differences of tacticity, which is due to isotactic orientation of the propylene units along the segments of the same chain (intramolecular). This compositional analysis is inferred from the results of a detailed analysis which includes differential scanning calorimetry, electron microscopy and relaxation measurement. In the presence of significant intramolecular differences in tacticity, 'stereoblock' structures are formed, as described below, where the number of isotactic propylene residues adjacent to one another is much greater than statistical. Further, the melting point of these polymers depends on the crystallinity, since the more blocky polymers should have a higher melting point as well as depressed solubility in room temperature solvents.

E. Second Polymer (Ethylene Polymer)

The reactor blends described herein include a second polymer component (second polymer), which preferably is (or includes) an elastomer having more than 30 wt % or 40 wt %, or 50 wt % units derived from ethylene monomer. The crystallinity, and hence other properties as well, of the second polymer are preferably different from those of the first polymer.

Preferably, the second polymer (also referred to as the "ethylene polymer") is non-crystalline, e.g., atactic or amorphous, but in certain embodiments the second polymer is crystalline (including "semi-crystalline"). But any crystallinity of the second polymer is preferably derived from the ethylene, and a number of published methods, procedures and techniques are available for evaluating whether the crystallinity of a particular material is derived from ethylene. The crystallinity of the second polymer can be distinguished from the crystallinity of the first polymer by removing the first polymer from the composition and then measuring the crystallinity of the residual second polymer. Such crystallinity measured is usually calibrated using the crystallinity of homo-polyethylene and related to the comonomer content. The percent crystallinity in such cases is measured as a percentage of homo-polyethylene crystallinity and thus the origin of the crystallinity from ethylene is established.

Preferably, in addition to units derived from ethylene, the second polymer also includes units derived from an α-olefin monomer, which in certain embodiments is the same as the α-olefin monomer used in forming the first polymer, and in other embodiments is at least partially different from the α-olefin monomer used in forming the first polymer, in which case it is referred to as a "second α-olefin." Any of the α-olefin monomers listed above in the context of the first polymer can be used, particularly butane-1, pentene-1, hexene-1, heptene-1, or octene-1. Advantageously, the second polymer can be formulated using different α-olefin monomers, selected from the list above for the first polymer, and/or different amounts of monomers, e.g., ethylene and α-olefin monomers, to prepare different types of second polymers, e.g., ethylene elastomers having desired properties. Accordingly, a blend composition can be prepared in which the composition includes a first polymer having one set of properties and a second polymer having a different set of properties, so that the composition has the desired mix or balance of desired properties. Advantageously, a continuous multistage process (series or parallel) can be used to form that composition, without the need to apply any separation step, e.g., removal of solvents, e.g., by devolatalization, or without any need to physically combine polymers after separation.

Preferably, the second polymer is formed during (or by) the second polymerization, which in the case of series reactors is preferably conducted in a reactor positioned downstream of the reactor in which the first polymerization is conducted, in which most of the first polymer is formed. In the case of a parallel process, involving parallel polymerization and/or parallel reactors, the "second polymer" may be formed at the same time as the "first polymer," but the product streams (still including solvent) are combined after the first and second polymers are sufficiently formed.

Preferably, the second polymer includes (or is) an elastomeric polymer, which is preferably an ethylene-alpha-olefin elastomer (including ethylene-cyclic olefin and ethylene-alpha-olefin-diolefin) having high molecular weight (as measured by Mooney Viscosity) and low crystallinity. The second polymer can be prepared utilizing any appropriate catalyst, but preferably the catalyst described below. In at least one specific embodiment, the second polymer is formed in the presence of a catalyst (e.g., the "second catalyst") that is different from the catalyst used for polymerizing the first polymer (e.g., the "first catalyst"). Any number of second polymers having a selected composition (e.g., monomer type and content) and properties can be formed.

One purpose of the first polymer is to enhance the attributes of the second polymer. Such enhancements can manifest themselves in a variety of ways depending on the specific application and the specific blend contemplated. Such enhancements include, but are not limited to, improvements in cure rate and state; processability as defined by such processes as milling, extrusion, calendering and injection molding; physical properties such as toughness, tack, adhesion, tear resistance, tensile and elongation and heat aging as defined by the retention of such physical properties at elevated temperatures.

For example, any one of the ethylene, alpha-olefin, vinyl norbornene elastomers described in U.S. Pat. No. 6,376,610, or any of such elastomers incorporating ENB as the polyene, primarily intended for use in a power cable coating compound, can be formed as a second polymer. The portions of that patent describing the elastomers, their properties, and methods for making them, are hereby incorporated by reference for purposes of U.S. patent practice.

Also, any of the ethylene, alpha-olefin elastomeric polymer compositions described in U.S. Pat. No. 6,271,311, or any of such elastomers incorporating ENB as the polyene, which are primarily intended to be formed into extruded articles, can be formed as a second polymer. The portions of that patent describing the elastomers, their properties, and methods for making them, are hereby incorporated by reference for purposes of U.S. patent practice.

Further, a second polymer can be any of the ethylene, alpha-olefin, vinyl norbornene elastomers described in U.S. Pat. No. 5,807,946, or any of such elastomers incorporating ENB as the polyene, primarily intended for use in vehicle parts. The portions of that patent describing the elastomers, their properties, and methods for making them, are hereby incorporated by reference for purposes of U.S. patent practice.

Additionally, any of the ethylene, alpha-olefin, vinyl norbornene elastomers described in U.S. Pat. No. 5,766,713, or any of such elastomers incorporating ENB as the polyene, primarily intended for use in vehicle hoses, can be formed as a second polymer. The portions of that patent describing the elastomers, their properties, and methods for making them, are hereby incorporated by reference for purposes of U.S. patent practice.

Also, any of the ethylene, alpha-olefin, vinyl norbornene elastomers described in U.S. Pat. No. 5,698,650, or any of such elastomers incorporating ENB as the polyene, primarily intended for use in vehicle brake parts and power transmission belts, can be formed as a second polymer. The portions of that patent describing the elastomers, their properties, and methods for making them, are hereby incorporated by reference for purposes of U.S. patent practice.

Furthermore, any of the ethylene, alpha-olefin, vinyl norbornene elastomers described in U.S. Pat. No. 5,656,693, or any of such elastomers incorporating ENB as the polyene, having improved cure properties, can be formed as a second polymer. The portions of that patent describing the elastomers, their properties, and methods for making therein, are hereby incorporated by reference for purposes of U.S. patent practice.

Also, any of the ethylene, alpha-olefin, non-conjugated bicyclic diene elastomeric polymers described in U.S. Pat. No. 5,654,370, or any of such elastomers incorporating ENB as the polyene, which can then be compounded and calendered into a sheet, can be formed as a second polymer. The portions of that patent describing the elastomers, their properties, and methods for making them, are hereby incorporated by reference for purposes of U.S. patent practice.

Finally, any of the ethylene, alpha-olefin, vinyl norbornene elastomers described in U.S. Pat. No. 5,571,883, or any of such elastomers incorporating ENB as the polyene, which can be used to form motor vehicle vibration damping parts, can be formed as a second polymer. The portions of that patent describing the elastomers, their properties, and methods for making them, are hereby incorporated by reference for purposes of U.S. patent practice.

Therefore, as exemplified in the above patents, the second polymer can include one or more optional polyenes, including particularly a diene; thus, the second polymer can be an ethylene-propylene-diene (commonly called "EPDM"). The optional polyene is considered to be any hydrocarbon structure having at least two unsaturated bonds wherein at least one of the unsaturated bonds is readily incorporated into a polymer. The second bond may partially take part in polymerization to form long chain branches but preferably provides at least some unsaturated bonds suitable for subsequent curing or vulcanization in post polymerization processes. Examples of the optional polyene include, but are not limited to butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_r$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyl-tetrahydroindene; dicyclopentadiene; bicyclo-(2.2.1)-hepta-2,5-diene; and alkenyl-, alkylidene-, cycloalkeryl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

F. Series Process

As noted above, one form of multistage polymerization is a series process (e.g., series reactor process). Preferably, in a series process, involving sequential polymerizations, two (or more) reactors are connected to one another in "series" via a conduit (e.g., piping) so that material exiting one reactor (e.g., effluent) is fed to the other reactor, although valves or other components may be interposed between the two reactors. Sometimes the two (or more) series reactors are referred to as a single "series reactor."

Preferably, the series process is a continuous solution polymerization process that involves continuously directing materials through a sequential train of reactors (series reactors). The train of reactors includes at least two polymerization reactors connected in series (i.e., sequentially) where the individual first polymer and second polymer are made in the separate reactors. (The first and second polymers may also be referred to as the first and second polymer "components.") A first reactor can be operated to polymerize the first polymer in solution. The reactor effluent from the first reactor is then introduced, in whole or in part, to a second reactor which is operated to polymerize the second polymer. This arrangement ensures that the second polymer, made in the second reactor, is made in the presence of the first polymer, which is made in the first reactor. It will be recognized, of course, that because the reactants in the polymerization in the second reactor include both monomers and a fully formed first polymer, the polymerization product from (or in) the second reactor (which is or includes a "reactor blend composition") may include not only the second polymer but also one or more polymer species that include or have incorporated therein a "first polymer" or a "second polymer," but do not fall neatly into the category of either a "first polymer" or a "second polymer" according to any of the definitions herein. It is noted, however, that the "second polymer" can nevertheless be separately identified using any of a number of recognized analytical methods and techniques, whether by direct measurement or calculation.

In general, except as noted otherwise, polymerization in each reactor may be conducted by any of the polymerization procedures known in the art, including making adjustments as needed or desired based on the circumstances and equipment being used. However, it is preferred that the polymerization be conducted under conditions where the reactants and products are completely in solution. These polymerization conditions can be obtained by using a solvent, in sufficient quantities, common to both of the polymeric components as the polymerization medium at suitable reaction conditions, including temperature and pressure, such that all of the components of the polymer mixture are maintained in solution.

CFSTR. A particularly preferred arrangement is a train of at least two continuous flow stirred tank reactors (CFSTR) connected in series. The physical structures and construction of such arrangement per se can be conventional. However, each reactor should be capable of being fed independently with monomer, solvent, catalyst, etc. In addition, the agitation provided to qualify as a CFSTR should be vigorous enough to avoid unmixed zones in the reactor. Such design considerations of CSFTR are well known to a skilled person in the art. It may be desirable to remove polar compounds that act as catalyst poisons. All solvent and monomer feeds can be purified over molecular sieves, alumina beds, or other absorbents as known in the art. In preferred embodiments, heat is removed from each reactor during polymerization. Heat removal can be accomplished by methods well known in the art such as auto-refrigeration, feed prechilling (adiabatic reactors), cooling coils, or various combinations of these techniques. Adiabatic reactors with prechilled feeds are preferred.

Polymerization Temperatures. A preferred feature of the process of forming the reactor blends herein is the different temperatures at which the different reactions (polymerizations) are conducted. Temperatures can be measured at one or several points within the reactor using one or several temperature probes, using equipment and procedures known to persons skilled in the art. In certain embodiments described herein, the second polymerization temperature (e.g., temperature in the second reactor) is higher than the first polymerization temperature (e.g., temperature in the first reactor). Those temperatures are specified above, as part of the specific embodiments.

Reaction Pressures. Pressure in each reactor should be sufficient to keep the reactor contents in solution at the selected reactor temperature. Preferably, the first polymerization (e.g., polymerization conducted in a first reactor) and the second polymerization (e.g., polymerization conducted in a second reactor) is "maintained" at a particular level or range, meaning that the polymerization pressure is kept substantially constant during production of at least a particular first polymer and/or reactor blend, although it is understood that during continuous polymerization cycles there may be periodic adjustments, e.g., during startup, grade changes or maintenance sessions. Although other pressures or pressure ranges may in certain cases be utilized, it is preferred that the first polymerization is conducted at a pressure ranging from any low of 2100 kPa, or 1750 kPa, or 1400 kPa, or 1050 kPa, or 700 kPa, to any high of 14,700 kPa, or 13,300 kPa, or 12,600 kPa, or 11,900 kPa, or 11,200 kPa. It is preferred that the second polymerization (which in certain embodiments is set at the same level as the first polymerization, or within the same specified range) is conducted at a pressure ranging from any low of 2100 kPa, or 1750 kPa, or 1400 kPa, or 1050 kPa, or 700 kPa, to any high of 14,700 kPa, or 13,300 kPa, or 12,600 kPa, or 11,900 kPa, or 11,200 kPa.

Residence Times. As used herein, the term "residence time" means the average time during which reactants for a particular polymerization are present together with catalyst in a particular reactor. This is calculated by dividing the reactor volume by total volumetric flow rate. The residence time per reactor is dependent on many factors, including the size of the reactor. An example of residence time for each reactor is from 1 to 180 minutes; or more narrowly from 5 to 30 minutes. Although other residence times or ranges of residence times may in certain cases be utilized, it is preferred that the first residence time range from a low of 4 minutes, or 5 minutes, or 6 minutes, or 7 minutes, or 8 minutes, or 9 minutes, to a high of 100 minutes, or 90 minutes, or 80 minutes, or 70 minutes, or 60 minutes, or 50 minutes. It is preferred that the second residence time range from a low of 4 minutes, or 5 minutes, or 6 minutes, or 7 minutes, or 8 minutes, or 9 minutes, to a high of 30 minutes, or 25 minutes, or 20 minutes, or 15 minutes, or 12 minutes, or 10 minutes.

Monomers. The monomers used in both polymerizations are set forth elsewhere herein, and are determined based on the desired composition of the particular polymer that is being formed. The monomers may include, for example, ethylene ($C_2$) and α-olefins ("alpha-olefins"), including higher alpha olefins ($C_4$-$C_{20}$), as well as polyenes, e.g., non-conjugated dienes. A particularly useful alpha olefin is propylene, although other higher alpha olefins may be used as set forth elsewhere herein.

Solvents. As noted above, a preferred method involves solution polymerization, which requires a solvent. Examples of solvent that can be used in the first and second polymerizations described herein (e.g., introduced to the first and second reactors) are hydrocarbons such as aliphatics, cycloaliphatics, and aromatic hydrocarbons. Preferred solvents are $C_{12}$ or lower straight-chain or branched-chain, saturated hydrocarbons, and $C_5$ to $C_9$ saturated alicyclic or aromatic hydrocarbons. Examples of such solvents are hexane, butane, pentane, heptane, cyclopentane, cyclohexane, cycloheptane, methyl cyclopentane, methyl cyclohexane, isooctane, benzene, toluene and xylene. Hexane is preferred. Preferably, the same solvent is used in both polymerizations, e.g., in both reactors, and is recycled, as discussed below.

Effluent Streams. As discussed elsewhere herein, during operation of the continuous process, each reactor experiences polymerization that produces an effluent stream. That effluent stream can be composed of polymer produced from the polymerization as well as catalyst and any unreacted monomers. Each effluent stream can be characterized as having a particular polymer concentration. As an example, the polymer concentration in the effluent of each reactor can be maintained in the range of 1 to 30% by weight or between 3 to 20% by weight, based on the total weight of the particular effluent. As exemplified in the Example below, involving a series reactor configuration, the polymer concentration of the first effluent preferably represents the first polymer only (which can be measured, for example, by separating the formed polymer from non-polymer materials). In contrast, the polymer concentration of the second effluent represents all the polymer material present in the second reactor, measured at a given time, e.g., after a particular residence time or some other set point. That polymer material includes at least the reactor blend, which may include a certain amount of the first polymer together with at least one other polymer, e.g., a second polymer that is either a reaction product of the first polymer together with other reactants present during the second polymerization, or a reaction product of the other reactants themselves, e.g., the monomers, or both forms of reactant product). Although other polymer concentrations or ranges of concentrations may in certain cases be utilized, it is preferred that the first effluent polymer concentration range from any low of 1 wt %, or 2 wt %, or 3 wt %, or 4 wt %, or 5 wt %, or 6 wt %, to any high of 30 wt %, or 25 wt %, or 20 wt %, or 16 wt %, or 12 wt %, or 8 wt %. It is preferred that the second effluent polymer concentration range from any low of 3 wt %, or 4 wt %, or 5 wt %, or 6 wt %, or 7 wt %, or 8 wt %, to any high of 30 wt %, or 25 wt %, or 20 wt %, or 18 wt %, or 16 wt %, or 14 wt %.

Polymer Recovery. A polymer can be recovered from either effluent (e.g., the effluent from the first reactor or the effluent from the second reactor), by separating the polymer from other constituents of the effluent. Conventional separation means may be employed. For example, polymer can be recovered from effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. In both series and parallel configurations, the catalyst may be deactivated when the reactor effluents have been combined. Deactivation should be used to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Polymerization Rates. For an adiabatic reactor using feed chilling as the method of heat removal, the overall polymerization rate is set by the difference between the temperature of the second reactor and the feed temperature. Since refrigeration is limited by the availability of commercial refrigeration units that are capable of chilling the feed to about −40° C., the economics is driven by the highest temperature at which the second reactor can be operated and still produce the polymer with desired properties such as molecular weight and long chain branching. Thus, it is desirable to operate the second reactor at substantially higher temperature than the first. Other factors that influence polymerization rate (also called production rate) are solvent type and rate, monomer type and polymer composition since the heat of polymerization varies with the choice of monomer.

Molecular Weight. The molecular weight characteristics (e.g., Mw, Mn, etc.) of the reactor blend and also of the individual first polymer and second polymer (polymer components) can in certain circumstances be adjusted depending upon the desired properties of the reactor blend. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

G. Parallel Process

Another form of multistage polymerization is a parallel process (parallel polymerization). In one example of a parallel process, two reactors are configured such that monomers, catalyst(s) and solvent are fed independently to each reactor. Note that the terms "first" and "second" do not imply any particular order or sequence, but the terminology is used for convenience so that all references herein to the word "first" (polymer, polymerization, catalyst, reactor, etc.) can apply equally to both the series and parallel processes, unless stated otherwise. In fact, the first and second polymerizations are preferably taking place simultaneously in a parallel process. The input (feed) for the first polymerization (preferably taking place in the first reactor) may be the same as the feed described above in the first polymerization of the series process, and includes, for example, monomers (propylene and one or both of ethylene and α-olefin monomer), catalyst mixture and solvent. The output or effluent (e.g., polymerization product) also resembles the effluent of the first polymerization in the series process, e.g., first polymer, catalyst, solvent and unreacted monomer, e.g., propylene monomer. Preferably, both the first and second polymerizations utilize propylene and ethylene as monomers albeit in different proportions.

The input (feed) for the second polymerization (preferably taking place in a second reactor) is the same as the feed described above in the second polymerization of the series process, with at least one significant difference, which is that the feed does not include any first polymer. Another difference is that dienes are preferably added to the second polymerization zone, e.g., reactor. The feed for the second polymerization can include, for example, monomers (ethylene and an α-olefin), catalyst mixture and solvent. The output or effluent (e.g., polymerization product) is second polymer, catalyst, solvent and unreacted monomer, e.g., ethylene monomer.

For a particular plant design, the plant productivity may be limited by the bottleneck presented by the recycle system. For example, a parallel reactor operation will typically require the recycling of larger amounts of solvent than for an equivalent amount of polymer with the same polysplit as series reactor operation. Also, a parallel reactor operation will permit wider variation in the residence time and reactor conditions than series reactor operation. In series reactor operation the residence time in the second reactor can be decreased over that in the first reactor by adding additional solvent to the second reactor up to the capacity limit for recycling the solvent. With parallel reactors the residence time of each reactor can be chosen independently as long as the total solvent flow does not exceed the recycle capacity.

The use of different polymerization temperatures is also an important feature of the parallel process, and the discussion above for series reactors applies equally to the parallel system. Also, the discussion above relating to reaction pressures used in series reactor processes applies to parallel processes in the same manner. Further, all discussion of residence time for series reactors also applies to parallel reactors.

Effluent Streams. As discussed elsewhere herein, during operation of the continuous process, each reactor experiences polymerization that produces an effluent stream. That effluent stream can be composed of polymer produced from the polymerization as well as catalyst and any unreacted monomers. Each effluent stream can be characterized as having a particular polymer concentration. As an example, the polymer concentration in the effluent of each reactor can be maintained in the range of 1 to 30% by weight or between 3 to 20% by weight, based on the total weight of the particular effluent. In parallel reactors, there can be three effluent streams, i.e., one from each reactor and the combined effluent stream. The polymer concentration of the effluent from each of the two reactors preferably represents the polymer made in that reactor alone (which can be measured, for example, by separating the formed polymer from non-polymer materials). Polymer concentration of the combined effluent represents all the polymer material present in the two reactors, measured at a given time, e.g., after a particular residence time or some other set point. That polymer material includes at least the reactor blend, which may include a certain amount of the first polymer together with at least one other polymer, e.g., a second polymer or a reaction product of the other reactants themselves, e.g., the monomers, or both forms of reactant product. Although other polymer concentrations or ranges of concentrations may in certain cases be utilized, it is preferred that the first effluent polymer concentration range from a low of 1 wt %, or 2 wt %, or 3 wt %, or 4 wt %, or 5 wt %, or 6 wt %, to a high of 30 wt %, or 25 wt %, or 20 wt %, or 16 wt %, or 12 wt %, or 8 wt %. It is preferred that the combined effluent polymer concentration range from a low of 3 wt %, or 4 wt %, or 5 wt %, or 6 wt %, or 7 wt %, or 8 wt %, to a high of 30 wt %, or 25 wt %, or 20 wt %, or 18 wt %, or 16 wt %, or 14 wt %.

Polymer Recovery. A polymer can be recovered from the effluent of either reactor or the combined effluent, by separating the polymer from other constituents of the effluent. Conventional separation means may be employed. For example, polymer can be recovered from effluent by coagulation with a nonsolvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline. Other methods of recovery such as by the use of LCST followed by devolatilization are also envisioned.

Polymerization Rates. For an adiabatic reactor using feed chilling as the method of heat removal, the overall polymerization rate of parallel reactors is set by the difference between the temperature of each reactor and the feed temperature. Since refrigeration is limited by the availability of commercial refrigeration units that are capable of chilling the feed to about −40C, the economics is driven by the highest temperature at which the two reactors can be operated and still produce the polymer with desired properties such as molecular weight and long chain branching. Other factors that influence polymerization rate (also called production rate) are solvent type and rate, monomer type and polymer composition since the heat of polymerization varies with the choice of monomer.

Molecular Weight. The molecular weight characteristics (e.g., Mw, Mn, etc.) of the reactor blend and also of the individual first polymer and second polymer (polymer components) can in certain circumstances be adjusted depending upon the desired properties of the reactor blend. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

H. Combined Series/Parallel Configuration.

In a particularly advantageous embodiment, a reactor system configuration is provided that includes a series reactor configuration and a parallel reactor configuration, and one configuration or the other can be selected depending on certain criteria. For example, a process is directed to using a series process to make a reactor blend composition having a first set of properties and/or having respective proportions of first polymer and second polymer, e.g., a given polysplit, followed by using a parallel process to make a reactor blend composition having a second set of properties and/or having respective proportions of first polymer and second polymer, e.g., a given polysplit. Preferably, but not necessarily, the former reactor blend composition, e.g. having a first set of properties, is removed from the system before the parallel process is implemented to produce the latter reactor blend composition.

In certain embodiments, a reactor blend composition is formed using a series process, as described above, e.g., involving polymerizing in a first polymerization zone in a solvent a feed of a first monomer system and a first catalyst system capable of providing isotactic stereoregularity to sequences of propylene-derived units to provide a mixture of the first polymer and unreacted monomers, said first polymer being a propylene polymer, having 60 wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45; and polymerizing in a second polymerization zone in a solvent a combined feed of the first polymer mixture, a second monomer system and a second catalyst system to provide a mixture that includes the first polymer and a second polymer, said second polymer being a random copolymer of ethylene and propylene-derived units, wherein the second polymer is either noncrystalline or has ethylene-type crystallinity; wherein: the overall composition has a combined Mooney (ML 1+4 at 125° C.) of from 25 to 180 and a heat of fusion less than 50 J/g.

Then, based on predetermined criteria, the process may be shifted to a parallel process (preferably after the series-produced reactor blend composition is removed from the vessels) and the parallel process may involve polymerizing in a first polymerization zone in a solvent a feed of a first monomer system and a first catalyst system capable of providing isotactic stereoregularity to sequences of propylene-derived units to provide a mixture of the first polymer and unreacted monomers, said first polymer being a propylene polymer, having 60 wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45; polymerizing in a second polymerization zone in a solvent a combined feed of a second monomer system and a second catalyst system to provide a mixture that includes the second polymer, said second polymer being a random copolymer of ethylene and propylene-derived units, wherein the second polymer is either noncrystalline or has ethylene-type crystallinity; and combining in the presence of the solvent the first polymer and the second polymer wherein the combination of the first polymer and the second polymer has a Mooney (ML 1+4 at 125° C.) of from 25 to 180 and a heat of fusion less than 50 J/g.

An example of a flow diagram of a multi-reactor configuration is shown in FIG. 1. The flow diagram is intended to illustrate certain processes described herein (particularly when viewed in conjunction with the process descriptions above), including processes involving alternating between series reactor flow and parallel reactor flow, as well as variable recycle. Each box in the flow diagram (identified below) represents apparatus or equipment, which can be conventional and need not be described in detail. Each of the lines (described below) connecting the boxes represents streams or flow of material, it being understood that streams can be directed through any of a variety of types of conduits, e.g., pipes, which may have intervening equipment (not shown) such as but not limited to standard connections, valves and pumps. The contents of WO 2002/34795 relating to reactors and other components are hereby incorporated by reference, particularly the details relating to the components also found in FIG. 1 herein, e.g., the separators and reactors.

Referring to at least certain embodiments of the processes described elsewhere herein, an overall system 10 is shown that is or includes box 12, i.e., a structure in which a first polymerization can take place, and is preferably a "first reactor" described elsewhere herein. Box 14 is or includes a structure in which a second polymerization can take place, and is preferably a "second reactor." Box 16 is a structure that can include a vessel for receiving the output of one or both of the structures 12 and 14 (e.g., effluent stream 36 and/or 38) and can also include a liquid-liquid phase separation device. Box 18 includes a structure in which devolatilization can occur, e.g., a "devolatilizer." Box 20 is a structure that receives and discharges monomers and solvent and optionally includes a fractionator or some other apparatus for separating monomers and solvent, either together or separately.

The polymerization in FIG. 1 can be practiced as a series process, i.e., sequential polymerizations, or as a parallel process, e.g., parallel polymerizations. Referring to FIG. 1, a first catalyst can be introduced to the first polymerization zone 12 (e.g., reactor) via stream 23, typically as part of a catalyst mixture, described elsewhere herein. Monomers can be introduced to polymerization zone 12 via stream 26. Fresh monomers can be introduced via stream 28. A first polymer (e.g., propylene polymer) is produced in polymerization zone 12. When a series configuration is utilized, the propylene effluent (including the propylene polymer) is directed via stream 34 to second polymerization zone 14, where a second polymerization is conducted to produce a second polymer (e.g., ethylene polymer). The effluent leaving the second polymerization (including both propylene polymer and ethylene polymer) via stream 36 is directed to a first separator 16 where it can be treated to separation, e.g., liquid-liquid phase separation, to separate a polymer-rich component from a non-polymer component (i.e., substantially no polymer). The non-polymer component includes solvent, unreacted monomers and catalyst. The polymer-rich component preferably includes primarily the polymer composition described herein which can be described as a reactor blend that includes propylene polymer and ethylene polymer. However, the polymer-rich component also includes materials such as unreacted monomers (e.g., propylene, ethylene and dienes) not successfully removed in the liquid-liquid separator. Accordingly, the polymer-rich component is fed via stream 40 to a second separator, e.g., devolatilizer 18, which removes a vapor stream 48 and a liquid stream 46, which has a higher concentration of polymer than does prevolatilized stream 40. Stream 40 can be further suitably processed to recover solvent-free product. The vapor stream 48, which includes unreacted monomers and solvent, is directed to a structure 20, from which monomers and solvent can either be discharged via stream 52 or reintroduced via stream 50 to the recycle stream 44. The structure 20 can include one or more fractionators (not shown) by which vaporized monomers such as ethylene, propylene and/or dienes (e.g., ENB) can be removed, separately or in combination. Structure 20 may also include a condenser that converts the vapor contents of stream 48 to liquid. Liquid output stream 50 may include monomers, and in certain cases solvent, and that stream 50 can be introduced to the liquid recycle stream 42, the composition of which can be adjusted as desired, based on the extent or amount of monomers being reintroduced, to provide recycle stream 44. Recycle stream 44 can be fed via stream 30 back to polymerization zone 14, and additional monomers, e.g., ethylene or dienes, can be added to the input stream 30. Recycle stream 46 can be fed via stream 26 back to polymerization zone 12, and additional monomers, e.g., propylene or ethylene, can be added via stream 28 to the input stream 26.

As noted above, the process(es) in FIG. 1 can be practiced as parallel polymerizations. Further, the configuration in FIG. 1 provides for changing or switching between the series approach (discussed above) and parallel polymerizations, which will now be discussed. With a parallel polymerization approach, the effluent stream 34 leaving the first polymerization zone 12 preferably bypasses the second polymerization zone 14 via bypass stream 38. Meanwhile, monomers are fed to the second polymerization zone 14 via input stream 30 which can include fresh monomers via stream 32 and/or monomers added as part of recycled stream 44. According to the parallel configuration, no first polymer (propylene polymer) is introduced to the second polymerization zone 14, but rather only monomers, solvent and catalyst are added via streams 30 and 24. The second (ethylene) polymer is formed in the second polymerization zone, and effluent that includes ethylene polymer, unreacted monomers, solvent and catalyst leaves the second polymerization zone via stream 36, and is combined with the effluent from the first polymerization zone, which includes the first (propylene) polymer, either before entering the vessel (as shown in FIG. 1) or, alternatively, after entering the vessel (not shown). As discussed above, the combined effluent includes the polymer composition that comprises the propylene polymer (formed in the first polymerization zone) and the ethylene polymer (formed in the second polymerization zone). Certain embodiments relate to processes for making different elastomer compositions using the same reactors, e.g., in which the proportion of propylene polymer to ethylene polymer is different, or where the respective compositions of the propylene polymer and ethylene polymer are different. Using the proportion of the polymer produced in the respective reactors can be varied. In an aspect of the invention, a plant arrangement is provided for changing (shifting) from a series process configuration to a parallel process configuration and/or vice versa, preferably based on predetermined criteria. Preferably, a parallel process is selected based at least in part on one or more (and preferably all) of the following measured values, which can be determined in advance of the change or shift (predetermined): (a) a preselected polysplit (calculated as weight of the first polymer divided by the combined weight of the first polymer plus the second polymer); (b) the propylene content of the propylene polymer (e.g., first polymer); and (c) the ethylene content of the reactor blend composition (combined first and second polymer). Particularly preferred embodiments include processes involving forming a first elastomer composition using a series process, then changing the flow of the monomers and solvent to a parallel process to provide a second elastomer composition that has a different polysplit, or different monomer (C3 or C2) contents. Preferably, the parallel process is utilized at the same time (e.g., while or when or during) the polysplit is greater than or equal to a preselected "C3C2 Factor." Broadly, a C3C2 Factor is defined as any value that depends on, e.g., some calculated combination of, FPP (first polymer propylene content) or BPE (blend polymer ethylene content), or both. A preferred C3C2 Factor is more precisely defined as $575 * (100\text{-FPP})^{0.14} * (BPE)^{-0.81}$ (Equation 1). Preferably, the series process is changed to parallel process under circumstances when the polysplit is equal to or greater than the C3C2 Factor. The precise timing of the change may not necessarily be critical, and will generally occur either after the polysplit changes or after the target polysplit is identified that suggests the change. Table 1 below shows different maximum polysplits correlated to different FPP and BPE values, such that a parallel process (rather than a series process) should and implemented for any polysplit at or above the indicated maximum polysplit (e.g., a proposed setpoint).

TABLE 1

| Setpoint | Maximum Polysplit | FPP (wt % C3) | BPE (wt % C2) |
|---|---|---|---|
| 1 | 46 | 95 | 24 |
| 2 | 36 | 95 | 40 |
| 3 | 22 | 95 | 64 |
| 4 | 48 | 88 | 27 |
| 5 | 38 | 88 | 42 |
| 6 | 23 | 88 | 64 |
| 7 | 50 | 80 | 30 |
| 8 | 40 | 80 | 44 |
| 9 | 25 | 80 | 65 |

The following spectrum of blends in Table 2 may be produced in accordance with processes described herein:

TABLE 2

| First Polymer (wt % C2) | Second Polymer (wt % C2) | Polysplit Range | Series or Parallel |
|---|---|---|---|
| 8-16 | 40-80 | <20 to <60 | Series |
| 8-16 | 40-80 | >20 to >60 | Parallel |

I. Recycle

A particularly advantageous feature of certain processes described herein is the variable recycle feature, which contemplates several different versions (embodiments). In at least one version of the process, a given amount of non-polymer (e.g., in the form of one or more streams) from an effluent (e.g., either the first effluent, second effluent or a combined effluent) is directed to either or both the first and second polymerization zones, which is represented in at least certain embodiments by first and second reactors. Preferably, the respective amounts of non-polymer directed to the first and second polymerization zones are different from one another. Depending on the nature of the first and second polymers, the recycled material may be solvent, catalyst, or monomers, in combination or separately.

Thus, in a preferred embodiment, a continuous process is provided for making an elastomer composition that includes a first polymer and a second polymer (described above). The process preferably includes forming the first polymer and second polymer in first and second polymerization zones (in series or parallel) each in the presence of a solvent that is preferably a common (the same) solvent, using the same or different catalyst systems (described above in greater detail); and also using monomer systems for each polymerization zone that preferably include propylene and ethylene, albeit in different proportions. As noted above, the second polymerization temperature is preferably higher than the first polymerization temperature by a substantial amount, as noted above, e.g., by 20° C. or more, and the second monomer system that is introduced to the second polymerization zone preferably includes dienes, whereas preferably either no dienes or an insubstantial amount of dienes (less than 2 wt % or less than 5 wt %) are added to the first polymerization zone. The process involves polymerizing the first and second polymers in different polymerization zones, and providing a reactor blend that includes first polymer, second polymer, solvent and unreacted monomer. Then the process includes removing solvent and unreacted monomer from the reactor blend; directing a recycle stream that includes solvent and unreacted monomer to the first polymerization zone and the second polymerization zone; and recovering an elastomer composition that includes first polymer and second polymer and has a Mooney Viscosity (ML (1+4) @125° C.) of from 16 to 180, or other levels (or ranges) as specified elsewhere herein.

Preferably, the process includes splitting the recycle stream into a first recycle stream and a second recycle stream, directing the first recycle stream to the first polymerization zone and directing the second recycle stream to the second polymerization zone. Preferably, the amount of solvent in the second recycle stream is selected to be sufficient to (i) obtain a desired second polymerization temperature relative to the first polymerization temperature; or (ii) obtain a desired polysplit, as noted below and elsewhere herein.

As discussed elsewhere herein, the removing of solvent and unreacted monomer from the reactor blend can include (i) subjecting the reactor blend to a first separation step to provide a first solvent-rich portion and a second solvent-lean portion; (ii) subjecting the first solvent-lean portion to a second separation step to provide a second solvent-rich portion and a second solvent-lean portion; (iii) combining the first solvent-rich portion and the second solvent-rich portion to provide a combined recycle stream; (iv) directing the combined recycle stream to the first polymerization zone and the second polymerization zone.

Furthermore, the removing of solvent and unreacted monomer from the mixture can include subjecting at least a portion of the mixture to liquid phase separation to provide a solvent-rich portion (typically a polymer-lean portion) and a solvent-lean portion (typically a polymer-lean portion), and wherein the solvent-rich portion is directed to the first polymerization zone and the second polymerization zone.

Still further, the removing of solvent and unreacted monomer from the mixture can include subjecting at least a portion of the mixture to devolatization to provide a solvent-rich portion and a solvent-lean portion, and wherein the solvent-rich portion is directed to the first polymerization zone and the second polymerization zone.

Certain embodiments relate to processes for making different elastomer compositions using the same reactors but varying recycle splits between the reactors. The processes may thus include adjusting the recycle flow(s) to the different reactors. Broadly, the "recycle amount" (a term applicable to both batch and continuous processes) can be varied. In a continuous process, however, it is the "recycle rate" (amount introduced to a reactor over a unit time) that is provided or established based on certain criteria. The "recycle rate" is a general term that encompasses (a) the total amount of recycled material fed to both reactors over a unit time ("combined recycle rate") or (b) the amount of recycled material fed to the first reactor over a unit time ("first reactor recycle rate") or (c) the amount of recycled material fed to the second reactor over a unit time ("second reactor recycle rate"). In those cases, the "recycled material" is defined in terms of at least solvent, but may also be solvent plus unreacted monomers, or as total recycled effluent which may also include recycled catalyst). In certain embodiments, any of the aforementioned recycle rates (lbs or kg per hour) can be adjusted in terms of changing from a first recycle rate to a different recycle rate (e.g., a second rate or a third rate, etc.) (kg per hour). The "recycle split" is defined as the first reactor recycle rate divided by the combined recycle rate, which can be expressed in terms of a percentage (as discussed below).

In at least one embodiment, the recycle split is adjusted based at least in part on one or more (and preferably all) of the following measured values, which can be determined in advance of the change or shift (predetermined): (a) a preselected polysplit (calculated as weight of the first polymer divided by the combined weight of the first polymer plus the second polymer); (b) the temperature of the second polymerization zone (e.g., second reactor); and (c) the temperature of the first polymerization zone (e.g., first reactor).

Particularly preferred embodiments include processes involving forming a first elastomer composition using a series process, then changing the flow of the monomers and solvent to a parallel process to provide a second elastomer composition that has a different polysplit, or different monomer (C3 or C2) contents, based on the criteria discussed above, i.e., the C3C2 Factor; and further changing the recycle split, preferably in accordance with the following criteria. A conventional flow control valve is preferably used to control the recycle split.

When an elastomer composition is prepared using any of the series processes described above, the "recycle split," defined as the percent of total recycle solvent directed to the first polymerization zone (e.g., first reactor) should be represented by Equation 2. The equality expressed in Equation 2 should be present at some point in the process, i.e., during formation of the elastomer composition, and it is more preferably maintained throughout the process (but allowing for the usually process oscillation) above or below this amount during the continuous process). In Equation 2, PS=polysplit; RT2=second reactor temperature (°C.); and RT1=first reactor temperature (°C.). Equation 2 specifies that the percent recycle to Reactor 1 is equal to $2.8*(PS)^{0.67}*(RT2/RT1)^{1.11}$.

When an elastomer composition is prepared using any of the parallel processes described above, the "recycle split," defined as the percent of total recycle solvent directed to the first polymerization zone (e.g., first reactor) should be represented by Equation 3. As with Equation 2, the equality expressed in Equation 3 should be present at some point in the process, and is preferably maintained throughout the process (allowing for oscillation). In Equation 3, PS=polusplit; RT2=second reactor temperature (°C.); and RT1=first reactor temperature (°C.). Equation 3 specifies that the percent recycle to Reactor 1 is to $4.5*(PS)^{0.55}*(RT2/RT1)^{0.67}$.

Table 3 below shows different recycle splits correlated to different PS values (polysplits) and RT2/RT1 values, for a series reactor configuration. Table 4 below shows different recycle splits correlated to different PS values and RT2/RT1 values, for a parallel reactor configuration. Reflecting at least certain embodiments, each combination is identified as a setpoint.

TABLE 3

| Setpoint | Recycle Split (%) | Polysplit | RT2/RT1 |
|---|---|---|---|
| 1 | 44 | 10 | 3.0 |
| 2 | 61 | 10 | 4.0 |
| 3 | 78 | 10 | 5.0 |
| 4 | 28 | 10 | 2.0 |
| 5 | 39 | 10 | 2.7 |
| 6 | 50 | 10 | 3.3 |
| 7 | 21 | 10 | 1.5 |
| 8 | 28 | 10 | 2.0 |
| 9 | 36 | 10 | 2.5 |
| 10 | 83 | 50 | 2.0 |
| 11 | 60 | 50 | 1.5 |
| 12 | 83 | 50 | 2.0 |
| 13 | 93 | 30 | 3.0 |
| 14 | 71 | 20 | 3.0 |
| 15 | 82 | 25 | 3.0 |
| 16 | 97 | 20 | 4.0 |
| 17 | 93 | 13 | 5.0 |

TABLE 4

| Setpoint | Recycle Split (%) | Polysplit | RT2/RT1 |
|---|---|---|---|
| 1 | 33 | 10 | 3.0 |
| 2 | 40 | 10 | 4.0 |
| 3 | 47 | 10 | 5.0 |
| 4 | 25 | 10 | 2.0 |
| 5 | 31 | 10 | 2.7 |
| 6 | 36 | 10 | 3.3 |
| 7 | 21 | 10 | 1.5 |
| 8 | 25 | 10 | 2.0 |
| 9 | 30 | 10 | 2.5 |
| 10 | 62 | 50 | 2.0 |
| 11 | 51 | 50 | 1.5 |
| 12 | 62 | 50 | 2.0 |
| 13 | 61 | 30 | 3.0 |
| 14 | 49 | 20 | 3.0 |
| 15 | 55 | 25 | 3.0 |
| 16 | 59 | 20 | 4.0 |
| 17 | 54 | 13 | 5.0 |

J. Polymerization Catalysts

In a broadest form, the compositions can be prepared using any SSC (single sited catalyst). Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such a cyclopentadienyl type ring structure. The ancillary ligand may also be a pyridinyl or amide ligand. The transition metal is preferably of Group 4 of the Periodic table such as titanium, hafnium or zirconium which are used in polymerrization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The transition metal complex may impose a degree of steric order on the propylene monomer by suitable chirality. Where first polymers of higher molecular weight are desired or higher polymerization temperatures, it is preferable to a non- or weakly coordinated anion (the term non-coordinating anion as used herein includes weakly coordinated anions) as cocatalyst. Alternatively aluminoxanes or complexes incorporating oxy-aluminum moieties may be used.

A precursor for the non-coordinating anion may be used with a transition metal complex supplied in a reduced valency state. The precursor may undergo a redox reaction. The precursor may be neutral, such as a borane complex and form the transition metal cation by abstracting a ligand from it. The precursor may be an ion pair of which the precursor cation, such as a borate, is neutralized and/or eliminated in some manner. The precursor cation may be an ammonium salt as in EP 277 003 and EP 277 004. The precursor cation may be a triphenyl carbonium derivative as in EP 426 637. The non-coordinating anion can be a Group 10-14 complex wherein boron or aluminum is the charge bearing atom shielded by ligands which may be halogenated and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups.

The non-coordinating anion may be used in approximately equimolar amounts relative to the transition metal complex, such as at least 0.25, preferably 0.5, and especially 0.8 and such as no more than 4, preferably 2 and especially 1.5.

The transition metal complex may be a pyridine amine complex useful for olefin polymerization such as those described in WO03/040201. The transition metal complex may a fluxional complex which undergoes periodic intramolecular re-arrangement so as to provide the desired interruption of stereoregularity as in Waymouth, U.S. Pat. No. 6,559,262. The transition metal complex may be a stereorigid complex with mixed influence on propylene insertion, as noted in Rieger EP 1 070 087.

Preferably the transition metal complex is a chiral bridged bis cyclopentadienyl derivative having the formula:

$$L^A L^B L_i^C MDE$$

where $L^A$ and $L^B$ are substituted or unsubstituted cyclopentadienyl or hetero-cyclopentadienyl ancillary ligand π-bonded to M in which the $L^A$ and $L^B$, ligands are covalently bridged together through a Group 14 element linking group; $L_i^C$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, the disclosures of which are hereby incorporated herein by reference. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from –0° C. to 200° C. for a time of from 1 second to 10 hours.

In certain embodiments, the first polymer of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene, with an Mn of up to 4 million. See Sassmannshausen, Bochmann, Rosch, Lilge, J. Organomet. Chem. (1997) 548, 23-28.

Other possible single site catalysts are metallocenes which are bis cyclopentadienyl derivatives having a group transition metal, preferably hafnium or zirconium. Such metallocenes may be unbridged as in U.S. Pat. Nos. 4,522,982 or 5,747,621. The metallocene may be adapted for producing a polymer comprising predominantly propylene-derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. Patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis(dimethylsilyl) zirconium dichloride and MAO; WO 98/27154 which discloses a dimethylsilyl bridged bisindenyl hafnium dimethyl together with a non-coordinating anion activator; EP1 070 087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non-or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP 277 004). The NCA precursor can be a neutral compound such as a borane, which is formed into a cation by the abstraction of and incorporation of the anionic group abstracted from the metallocene. (See EP 426 638).

K. Specific Catalysts

As noted elsewhere herein, polymerizations in the different reactors may in certain embodiments be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor in a variety of ways. For example, it may be delivered as a solution or slurry, either separately to the reactor, activated in-line just prior to the reactor, or preactivated and pumped as an activated solution or slurry to the reactor. Polymerizations are carried out in each reactor, in which reactant components (e.g., desired monomers, comonomers, catalyst/activators, scavengers, and optional modifiers) are preferably added continuously to the appropriate reactor. In some embodiments, both catalyst mixtures are added to the first reactor, while in other embodiments one catalyst mixture is added to the first reactor and a different catalyst mixture is added to the second reactor (although in a sequential operation at least some of the first catalyst mixture from the first reactor may be directed to the second reactor together with the product mixture from the first reactor.

In preferred embodiments, two different catalysts are added as part of different reactant feeds, e.g., a "first catalyst," which may be part of a "first reactant feed," and a "second catalyst," which may be part of a "second reactant feed," although in at least certain embodiments (e.g., series reactors) both first and second catalysts are present to some degree in the second reactor feed, e.g., when the first effluent is supplied to a second reactor. Preferably, in at least certain embodiments, the first catalyst is a chiral catalyst while the second catalyst is a non-chiral catalyst.

In certain embodiments of the processes and compositions, the same catalyst mixture can be used for each of the first and second polymerizations, whether series or parallel. For example, in certain processes, certain catalyst mixtures described in U.S. Pat. No. 6,207,756 can be used in both polymerizations, and that patent is hereby incorporated by reference in its entirety, particularly the portions describing the catalyst mixtures, e.g., column 8 line 20 through column 14, line 21. Preferred catalysts are those that are isospecific. A procedure for forming a specific example of a useful catalyst system is identified in Example 1 of that patent.

First Catalyst. The first catalyst is preferably a chiral catalyst. In at least one specific embodiment, the first polymerization is conducted in the presence of a first catalyst that is a "single sited polymerization catalyst," which preferably allows only a single statistical mode of addition of two different monomer sequences, e.g., propylene and ethylene sequences. The first catalyst is preferably well-mixed in a continuous flow stirred tank polymerization reactor, such that it allows only a single polymerization environment for substantially all of the polymer chains of the polymer. That first catalyst is preferably activated, meaning that it is combined in some manner with an activator.

As at least one example, a first catalyst can include a bis(cyclopentadienyl) metal compound and be combined with either (1) a non-coordinating compatible anion activator or (2) an alumoxane activator. (All references herein to "catalysts" preferably include activators as well, unless specified otherwise.) Non-limiting examples of catalyst systems (which include activators) which can be used are described in U.S. Pat. Nos. 5,198,401 and 5,391,629, the disclosures of which are hereby incorporated herein by reference. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from –0° C. to 200° C. for a time of from 1 second to 10 hours.

Second Catalyst. The second catalyst (if different than the first catalyst) is preferably a non-chiral catalyst and is also preferably well-mixed in a continuous flow stirred tank reactor. The second catalyst is preferably activated, meaning that it is combined in some manner with an activator. Examples of a second catalyst are set forth elsewhere herein, and are also set forth in WO 00/24793, which is hereby incorporated by reference.

EXAMPLE

The following example describes formation of a reactor blend composed of two different types of polymers, by continuous polymerization conducted using two continuous flow stirred tank reactors, arranged in series, to which different monomer mixtures and catalyst mixtures were fed continuously. Hexane solvent was fed to each reactor to maintain the contents of each reactor in solution. The temperature of the second reactor was substantially higher than that of the first reactor. Each catalyst stream was prepared by premixing catalyst and activator in 900 ml of toluene, and then fed to respective reactor using a metering pump. Catalyst Mixture A (fed to Reactor 1) was a mixture of unsupported dimethylsilyl bis (indenyl)hafnium dimethyl catalyst and dimethyl anilinium tetrakis (pentafluorophenyl) boron activator. Catalyst Mixture B (fed to Reactor 2) was a mixture of unsupported di-(p-tri-ethylsilyl-benzyl)carbyl (cyclopentadienyl) (2-7 di-t-butyl fluorenyl) hafnium dimethyl, as disclosed in U.S. Pat. No. 6,506,857 (Catalyst A) Examples 1 and 4, together with the same activator used in Catalyst Mixture A. See. Catalyst addition rates are shown in Table 5. Tri n-octyl aluminum was used as a scavenger in Reactor 1.

TABLE 5

| Reactor | Can Wt. (g) | Can Time (min) | Catalyst Mixture | Catalyst Rate | Scavenger | Hydrogen (g/h) | $C_2$ (g/h) | $C_3$ (g/h) | ENB (g/h) | $C_6$ (g/h) | T (° C.) |
|---|---|---|---|---|---|---|---|---|---|---|---|
| 1 | 534 | 10 | A | 0.00233 | 0.118 | 0 | 12 | 199.8 | 0 | 3564 | 47 |
| 2 | 2484 | 30 | B | 0.01101 | 0 | 0 | 228 | 45 | 32 | 1782 | 117 |

TABLE 6

| Reactor | Production Rate (g/hr) | Polysplit (%) | $C_2$ Conv (%) | $C_3$ Conv (%) | ENB Conv (%) |
|---|---|---|---|---|---|
| 1 | 74.6 | 26 | 134 | 29 | N/R |
| 2 | 289.6 |  | 74 | 44 | 48 |

Reactor 1 polymerization produced an effluent that included the first polymer product. That effluent, including unreacted monomers and catalyst mixture, was fed to Reactor 2, where polymerization was conducted under different reaction conditions. For example, in Reactor 2, a significantly higher reactor temperature was used. Also, a polyene (5-ethylidene-2-norbornene) was introduced. The production rate of each reactor was determined by timed collection of effluent followed by evaporating the solvent and measuring the remaining solids concentration. The production rate of Reactor 1 was determined by stopping the reaction in Reactor 2 and then performing a timed collection of the effluent from Reactor 1 using that same procedure. The combined production rate was measured following the same procedure using the output of Reactor 2 when both reactors were fully operational. Using that information, the ratio of Reactor 1 production rate to the combined production rate was calculated. That ratio is called "polysplit" in Table 6. Using the catalyst make-up and feed rate and production rate, catalyst productivities were calculated in terms of Catalyst Efficiency (g polymer/g catalyst).

Various properties of the polymer products formed in each reactor are reported in Tables 7 and 8. As seen in Table 7 the polymer formed in Reactor 1 had an ethylene content of 21 wt %. In contrast, the polymer product exiting Reactor 2, which was a reactor blend that included both the polymer formed in Reactor 1 plus additional polymer formed in Reactor 2, had an ethylene content of 61 wt %. The value of ethylene for the second polymer, calculated from the first polymer and reactor blend ethylene content and polysplit was 75%. The value of ENB was 6.9%. Other reported properties determined included Mooney Viscosity, Melt Index, molecular weight data and branching measurements (g' and BI), all reflected in Tables 7 and 8.

TABLE 7

| Reactor | $C_2$ (%) | ENB (%) | ML (1 + 4 @ 125° C.) | MI | Mw Lalls | Mz Lalls | Mw DRI |
|---|---|---|---|---|---|---|---|
| FIRST POLYMER | 21 | 0 | | 4.2 | 169737 | 270419 | 163966 |
| SECOND POLYMER | 75 | 6.9 | | | | | |
| Reactor Blend | 61 | 5.1 | 54 | | 250601 | 457361 | 230310 |

TABLE 8

| Reactor | Mn DRI | g' | BI | Mw/Mn | Mz/Mn |
|---|---|---|---|---|---|
| Rx1 | 83646 | 0.963 | 0.963 | 2.03 | 1.59 |
| Rx1 + Rx2 | 86947 | 0.951 | 0.949 | 2.88 | 1.83 |

The invention claimed is:

1. Continuous process for making an elastomer composition having a, Mooney Viscosity (ML (1+4) @125° C.) of from 16 to 180, the composition including a first polymer and a second polymer, the process comprising:
   polymerizing a first monomer system including propylene and optionally ethylene in a solvent using a first catalyst system in a first polymerization zone to provide a first polymer having 60 wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45;
   polymerizing a second monomer system that includes ethylene and optionally an alpha-olefin in a solvent using a second catalyst system in a second polymerization zone to provide a second polymer which is an elastomeric polymer comprising 30 wt % or more of units derived from ethylene that is either non-crystalline or has ethylene-derived crystallinity;
   combining the first polymer and the second polymer in a mixture that includes solvent and unreacted monomers;
   removing solvent and unreacted monomers from the mixture to form a single recycle stream, which is split into a first recycle stream and a second recycle stream;
   directing the first recycle stream to the first polymerization zone and directing the second recycle stream to the second polymerization zone to provide a recycle split; and
   recycling ethylene monomers, propylene monomers, and optionally alpha-olefin monomers and solvent for polymerization;
   to provide an elastomer composition having a Mooney Viscosity (ML (1+4) @125° C.) of from 16 to 180;
   wherein the process is operated in a series reactor mode or a parallel reactor mode and the percent recycle to the first reaction zone is equal to:

a. $2.8 * (PS)^{0.67} * (RT2/RT1)^{1.11}$ in series reactor mode; or b. $4.5 * (PS)^{0.55} * (RT2/RT1)^{0.67}$ in parallel reactor mode, where PS=polysplit of polymer produced in the first polymerization zone to the total polymer produced in the first and second polymerization zones, RT2=second reaction zone temperature (° C.), and RT1=first reaction zone temperature (° C.).

2. Process according to claim 1 in which the first polymerization is conducted to deplete propylene monomers to a level below what is desired for making the second polymer; the second polymerization and recycle are operated to reduce the alpha-olefin monomer to a level below what is required for making the first polymer, wherein additional makeup propylene monomer is added for the first polymerization and additional makeup alpha-olefin monomer is added for the second polymerization.

3. Process according to claim 1 in which the second polymer is a random copolymer of ethylene and propylene and optionally a diene.

4. Process according to claim 1 in which at least part of the effluent of the first polymerization zone is continuously directed to the second polymerization zone for series mode operation and/or at least part of the effluent of the first polymerization zone is combined with the effluent of the second polymerization zone for parallel mode operation.

5. Process according to claim 1 in which the mixture that includes the first polymer and the second polymer is finished by devolatilization to form pellets or bales.

6. Process according to claim 1 in which in which the fraction of the first polymer and the fraction of the second polymer produced are controlled by splitting the amount of solvent supplied to the first and second polymerization from the recycle and by providing additional fresh feed to vary the rate of flow and the heat removal capacity for each polymerization separately, the first polymerization being at a temperature below the melting point of the first polymer and the second polymerization being at a temperature from 20° C. to 200° C. higher than the temperature for the first polymerization.

7. Process according to claim 1 in which a transfer agent is used to limit the molecular weight in the first or second polymerization zone.

8. Process according to claim 1 in which the process is operated in parallel mode when the polysplit of polymer produced in the first polymerization zone to the total polymer produced in the first and second polymerization zones is greater than $575 * (100-FPP)^{0.14} * (BPE)^{-0.81}$, wherein FPP is the propylene content (wt %) of the propylene polymer and BPE is the ethylene content of either the series reactor blend composition or the parallel reactor blend composition.

9. Process according to claim 1 in which the amount of solvent in the second recycle stream is selected to be sufficient to (i) obtain a desired second polymerization temperature; or (ii) obtain a desired polysplit.

10. Process according to claim 1 in which removing solvent and unreacted monomer from the mixture includes (i) subjecting the mixture to a first solvent separation step for concentrating the polymer in remaining solvent (ii) subjecting the concentrated solution to a second step for further removing solvent and form molten polymer for pelletization and; (iii) combining solvent extracted from the first and second step to provide a combined single recycle stream; (iv) directing the combined recycle stream to the first polymerization zone and the second polymerization zone.

11. Process according to claim 10 in which the first step includes subjecting at least a portion of the mixture to liquid-liquid phase separation to provide a solvent-rich portion and a solvent-lean portion.

12. The process of claim 1 wherein the first polymer and the second polymer have been created using two different catalyst mixtures.

13. Continuous process for making an elastomer composition that includes a first polymer and a second polymer, the process comprising:
polymerizing a first monomer system that includes propylene and optionally ethylene in a solvent using a first catalyst system in a first polymerization zone to provide a first polymer, having 60wt % or more units derived from propylene, including isotactically-arranged propylene-derived sequences and further having a heat of fusion less than 45 J/g or a melting point less than 105° C. or both and a Mooney Viscosity (ML (1+4) @125° C.) of from 1 to 45;
polymerizing a second monomer system that includes ethylene and optionally an alpha-olefin in a solvent using a second catalyst system in a second polymerization zone to provide a second polymer that is elastomeric and either non-crystalline or has ethylene-derived crystallinity;
combining the first polymer and the second polymer in a mixture that includes solvent and unreacted monomers;
removing solvent and propylene and ethylene monomers from the mixture, to provide the elastomer composition; and
recycling propylene and ethylene monomers and solvent for polymerization via a single recycle stream which is split and directed to the first polymerization zone and the second polymerization zone to provide a recycle split wherein:
the first polymerization is conducted to deplete propylene monomers to a level below what is desired for making the second polymer;
the second polymerization and recycle axe operated to reduce the ethylene monomers to a level below what is required for making the first polymer; and
additional makeup propylene monomer is added, for the first polymelization and additional makeup ethylene monomer is added for the second polymerization; and
wherein the process is operated in a series reactor mode or a parallel reactor mode and the percent recycle to the first reaction zone is equal to:
a. $2.8 * (PS)^{0.67} * (RT2/RT1)^{1.11}$ in series reactor mode; or
b. $4.5 * (PS)^{0.55} * (RT2/RT1)^{0.67}$ in parallel reactor mode,
where PS= polysplit of polymer produced in the first polymerization zone to the total polymer produced in the first and second polymerization zones, RT2=second reaction zone temperature (° C.), and RT1=first reaction zone temperature (° C.).

14. Process according to claim 13 in which the first polymer has a heat of fusion less than 45 J/g or a melting point less than 105° C. or both and a Mooney Viscosity (ML (1+4) @125° C.) of from 1 to 45; and the elastomer composition has a Mooney Viscosity (ML (1+4) @125° C.) of from 16 to 180.

* * * * *